United States Patent [19]

Glamm

[11] Patent Number: 4,928,494
[45] Date of Patent: May 29, 1990

[54] INCREMENTAL ELECTRICALLY ACTUATED VALVE

[75] Inventor: Paul R. Glamm, La Crosse, Wis.

[73] Assignee: American Standard Inc., New York, N.Y.

[21] Appl. No.: 286,683

[22] Filed: Dec. 20, 1988

[51] Int. Cl.[5] .................... F25B 41/04; F16K 31/04
[52] U.S. Cl. ................... 62/222; 251/129.11; 251/129.14; 251/129.05; 137/901
[58] Field of Search ............. 251/129.11, 176, 129.14, 251/129.05; 137/901; 62/222

[56] References Cited

U.S. PATENT DOCUMENTS

| | | | |
|---|---|---|---|
| 1,334,870 | 3/1920 | Lowry | 137/901 X |
| 1,869,741 | 8/1932 | Du Bois | 251/176 |
| 2,917,069 | 12/1959 | Lundy et al. | 251/129.11 X |
| 3,749,355 | 7/1973 | Paul, Jr. | 137/901 X |
| 3,955,591 | 5/1976 | Baumann | 251/176 X |
| 3,967,781 | 7/1976 | Kunz | 236/68 |
| 4,362,027 | 12/1982 | Barbier | 62/197 |
| 4,523,436 | 6/1985 | Schedel et al. | 62/222 |
| 4,546,795 | 10/1985 | Okamoto et al. | 137/624 |
| 4,593,881 | 6/1986 | Yoshino | 251/124 |
| 4,606,199 | 8/1986 | Gotzenberger | 62/225 |
| 4,632,358 | 12/1986 | Orth et al. | 251/117 |
| 4,674,292 | 6/1987 | Ohya et al. | 62/223 |
| 4,732,174 | 3/1988 | Ueno | 137/625 |

Primary Examiner—Arnold Rosenthal
Attorney, Agent, or Firm—William J. Beres; David L. Polsley

[57] ABSTRACT

An electrically actuated valve for incremental fluid flow rate control is disclosed. The valve is comprised of a valve body having an interior with a planar outlet surface against which a rectilinear valve element is slidingly operated. The valve body includes an inlet orifice and an outlet orifice in the planar outlet surface for fluid flow through the valve body. The valve element has an orifice therethrough controlling flow through the outlet orifice in accordance with the position of the valve element, which is linearly actuated by a rotary stepper motor.

19 Claims, 4 Drawing Sheets

INCREMENTAL ELECTRICALLY ACTUATED VALVE

TECHNICAL FIELD

This invention generally pertains to electrically actuated valves and more specifically to electrically actuated expansion valves providing constant incremental flow rate control.

BACKGROUND ART

Electrically actuated incremental valves suitable for use as expansion valves in refrigeration or air conditioning systems are typically comprised of two types. The first type typically includes a solenoid connected to an appropriate electrical supply which, in response to a pulsed electrical signal, actuates a plunger or control element alternately into and out of a flow path through the expansion valve body to permit or prevent fluid flow. The second type of electrically actuated expansion valve has a rotary actuator with a means for converting the rotary motion into linear motion for operating a valve element to increase or decrease the flow area available through the valve body by seating against a valve seat to close the valve and prevent flow or moving linearly away from the valve seat to permit flow through an area defined by the area of the opening between the valve element and the valve seat. There are disadvantages associated with both types of electrically actuated valves which have been found difficult to overcome in the prior art.

The solenoid actuated expansion valves tend to cycle between completely open and completely closed, cycling at rate in the range of fractions of hertz to hundreds or thousands of hertz. Thus these valves often suffer from a shortened life span due to component fatigue and wear induced by the high cycle rate and corresponding speed and frequency of component movement required to maintain relatively smooth fluid flow through the refrigeration system. In addition, these valves, due to the open-closed cycle action; cause a pulsation in the fluid flow through the expansion valve body, often inducing stress and related failures of other components in the refrigeration system in which they are employed. Furthermore, the solenoid actuated expansion valves are susceptible to damage or even failure due to debris or foreign matter flowing through the refrigeration system coming into contact with the valve components during operation of the valve. Therefore, many have turned to the rotary actuated expansion valve.

The typical rotary actuated expansion valve is operated by a rotary stepping motor providing incremental rotary motion which is translated then to incremental linear motion to actuate a valve element in a linear axial fashion. Typically, the valve element is driven against the valve seat to sealingly cover an aperture, preventing fluid flow therethrough and closing the valve or alternatively is driven away from the seat to open the valve. The distance of the valve element from the valve seat determines the flow area available through the valve up to a maximum determined by the area of the aperture of the valve seat. Alternatively, in a second type of rotary expansion valve, the valve element may be a member which is driven to cover or uncover the inlet or outlet orifice in a line normal to the flow through the valve body. In this type of rotary actuated valve, the flow is determined by the amount of area of the flow orifice which is uncovered at any given time by the valve element.

These typical rotary actuated expansion valves have a tendency to stick, due to friction and the viscosity of contaminants collected upon the valve body. Overcoming this tendency to stick requires oversized, costlier motors and concurrently decreases the controllability of the system. This decrease in controllability results from the fact that the rotary actuator may fail to overcome the sticking of the valve element for one or more actuating pulses or steps, therefore causing the valve element to be improperly positioned. The controller for the valve, having sent a specified number of pulses intended to actuate the valve to a desired opening, will in fact have actuated the valve to a smaller degree than calculated or desired. The system then indicates the need for further opening of the valve, and the controller will begin to "hunt" for the appropriate setting of the valve.

This second type of rotary actuated expansion valve also typically is comprised of many relatively small parts which must be machined to close tolerances to prevent fluid leakage through the valve and to improve operating characteristics. However, such close tolerance machining is often expensive and time-consuming, as is the assembly of valves containing such parts. Furthermore, the second type of rotary actuated expansion valve often includes a relatively large number of elastomeric seals to prevent flow from bypassing the valve element, as well as one or more springs having a large traverse distance, all of which are susceptible to wear and breakage. These items tend to substantially decrease the reliability of the valve in that wear can cause leakage through the valve and sticking of the valve, with a corresponding loss of control and efficiency of the system in which the valve is applied, as well as increased maintenance and downtime costs.

It is an object of the present invention to provide a rotary actuated valve of simple construction.

It is a further object of the present invention to provide a rotary actuated valve which is highly reliable, with low maintenance requirements and costs.

It is yet another object of the invention to provide such a valve which is susceptible of mass production.

It is yet another object of the invention to provide such a valve which is relatively immune to the effects of foreign matter or debris flowing through the valve.

It is yet another object of the present invention to provide such a valve as will appropriately respond to a controller input to permit a smooth, pulse-free fluid flow through the valve.

It is yet another object of the invention to provide such a valve which is suitable specifically for such applications as an expansion valve in a refrigeration system.

These and other objects of the present invention will be apparent from the attached drawings and the description of the preferred embodiment that follows hereinbelow.

SUMMARY OF THE INVENTION

The present invention is an incremental, electrically actuated valve of the rotary actuator type, having a valve body with an internal metering chamber including at least two spaced interior surfaces, both of which are preferably planar. The valve body has an inlet orifice in one surface and an outlet orifice in the opposed, planar second surface. A valve element having a metering orifice is disposed operably between the two surfaces of the valve body, to sealingly close the outlet orifice, or conversely to meter flow to the outlet orifice through the metering orifice of the valve element in an amount determined by the combined exposed area of the metering orifice and outlet orifice. The valve element operates linearly between the two surfaces, sealingly disposed against the planar outlet surface by inlet fluid pressure, linearly actuated by a rotary actuator through a rotary motion to linear motion conversion means. In alternative embodiments, the valve element may include a second orifice containing a closure member for insuring a sealing closure of the outlet orifice, and may include a biasing member for insuring sealing contact between the valve element and the planar surface containing the outlet orifice.

DESCRIPTION OF THE PREFERRED EMBODIMENTS

Figure 1:
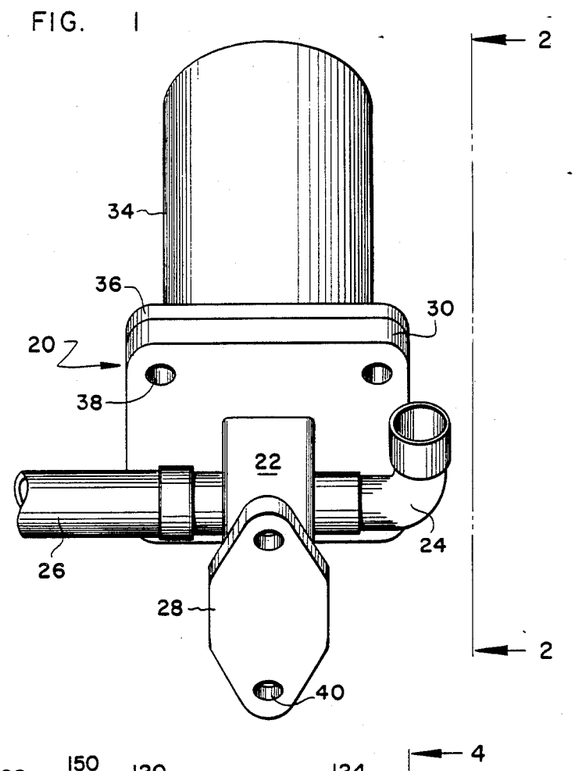
FIG. 1 shows a perspective view of the valve of the subject invention.

A valve according to the subject invention generally denoted by reference numeral 20 is shown in FIG. 1. The valve 20 has a valve body 22 with an inlet connection tube 24 and an outlet connection tube 26 for permitting flow through the valve body 22. The valve body 22 terminates at one end in a mounting foot 28 and has a motor mounting plate 30 at the opposing end. A motor housing 32, which is comprised of a cylindrical motor cover 34 welded to a planar cover base 36 of rectilinear outline, is secured to the motor mounting plate 30. The motor housing 32 is secured to the motor mounting plate 30 by means of welding or bolts (not shown) extending through corresponding bores 38 in the motor mounting plate 30 and the cover base 36. Two valve mounting bores 40 are provided adjacent the edges of the mounting foot 28, extending therethrough to permit the use of screws or bolts (not shown) for positioning and securing the valve 20 during installation.

Figure 2:
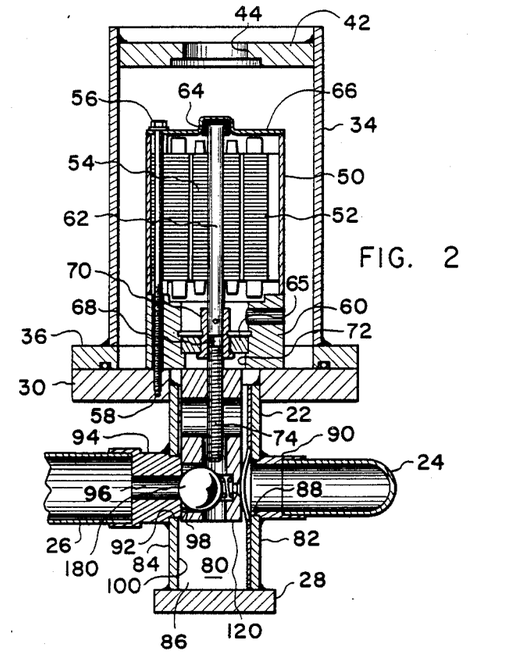
FIG. 2 shows a cross-sectional view of FIG. 1 taken along section line 2—2.

The valve 20 is shown in cross-sectional view in FIG. 2. In the preferred embodiment, the motor cover 34 also includes a cover end plate 42 welded thereto, the cover end plate 42 having a central aperture 44 through which power and control wiring (not shown) may communicate from the exterior to the interior of the motor housing 32. The motor cover central aperture 44 is preferably sealed by a suitable sealant to prevent contaminants from entering the motoring housing 32. Those skilled in the art will recognize that the aperture 44 for admitting power and control wiring may be provided in other locations on the motor housing 32, and that the motor housing 32 may be alternatively constructed. For example, the motor cover 34 and the cover end plate 42 may be a press-formed unitary component welded to the planar cover base 36, or the motor cover 34 and the planar cover base 36 may be a press-formed unitary component welded to the cover end plate 42. Also in the preferred embodiment, a groove containing a gasket 43 is included in the planar cover base 36 to prevent contaminants from entering the motor housing 32, but it will be apparent to those skilled in the art that this could be omitted and that other means of constructing the valve could accomplish the same result.

A motor 50 having a stator 52 and a rotor 54 is secured within the motor housing 32. The motor 50 is an incremental motor, also interchangeably known as a stepping motor or stepper motor, providing rotary motion in equal radial increments in response to the application of an external control or power signal. It is believed that this type of motor 50 is well known to those skilled in the art and that no discussion in further detail need be included herein.

A series of long threaded cap screws or bolts 56 positionally secures the motor 50. The bolts 56 extend into corresponding threaded mounting holes 58 in the motor mounting plate 30. The motor 50, as is shown in FIG. 2, may be spaced from the motor mounting plate 30 by a spacer block 60 to attain the proper relationship between the motor 50 and the motor mounting plate 30. It will be readily apparent to those skilled in the art that the motor 50 may vary from the embodiment described herein, for example, a motor 50 secured in the motor housing 32 by a press-fit therebetween (not shown), or may be secured by epoxy or a similar substance (not shown) or may include a flanged mounting foot having holes for mounting screws which are then secured in the planar cover base 36 (not shown).

The motor 50 also has a centrally disposed drive shaft 62 with an upper end disposed in a bearing means such as a sleeve bearing 64. The lower end of the drive shaft 62, as seen in FIG. 2, extends into and is fixed in a central bore 68 in a drive collar 70. The drive collar 70 is disposed within a central bore 72 in the motor spacing block 60. A lower motor bearing such as a roller bearing or sleeve bearing 65 is disposed in rotational engagement between the motor spacing block 60 and the drive collar 70 for permitting rotational motion of the drive collar 70. A threaded lead screw or drive screw 74 is secured in the bore 68 of the drive collar 70 and extends oppositely the drive shaft 62 into the valve body 22.

The valve body 22 has an internal metering chamber 80 defined by a first or inlet wall 82 and a spaced second or outlet wall 84. Preferably, two valve body side walls 86 join the first wall 82 and the second wall 84 to define a valve body 22 which has a substantially rectilinear cross-section when taken along a plane normal to the axis of the drive screw 74. The first inlet wall 82 has an inlet aperture 88 in which is secured an inlet collar 90 preferably by such means as welding or brazing. The inlet collar 90 is sealingly connected to and provides an inlet flow connection for the inlet tube 24. An outlet aperture 92 is provided in the second outlet wall 84. An outlet collar 94 is secured, preferably by such means as welding or brazing, in the outlet aperture 92 and is sealingly connected to the outlet tubing 26. A bore 96 is centrally defined through the outlet collar 94 for permitting metered flow communication from the internal metering chamber 80 to the outlet tubing 26.

Preferably, the outlet collar 94 has a metering face 98 extending a small distance into the internal metering chamber 80. This distance would preferably be in the range of 0.020 inches to 0.060 inches. It should be noted that the metering face 98 could also be coplanar with the inner surface 100 of the second or outlet wall 84. It will also be apparent to those skilled in the art that the outlet wall inner surface 100 could have the outlet bore 96 defined directly therethrough, and that the outlet collar 94 could be affixed by such means as welding or brazing to the second or outlet wall 84 externally or inserted into and affixed in the outlet aperture 92 with equal suitablilty for providing flow communication from the internal metering chamber 80 to the outlet tubing 26, as can the inlet collar 90 with respect to the inlet aperture 88. Finally it will be apparent to those skilled in the art that, although welded or brazed construction is indicated for convenience in the preferred embodiment, other means of construction are equally suitable.

In the preferred embodiment, the inner surface 102 of the inlet wall 82 is planar (see FIG. 5) and supports a biasing means such as a bifurcated leaf spring 104 having a central opening for permitting flow communication from the inlet aperture 88 to the internal metering chamber 80. Other biasing means such as a coil spring would be equally suitable. Those skilled in the art will also recognize that the biasing means need not be included in the variable flow rate valve of the subject invention, but rather serves to improve the operation of the valve as described hereinbelow.

A valve element or metering piston 120 is generally disclosed in various embodiments in FIGS. 2 through 12. The preferred embodiment of the metering piston 120 is disclosed in FIGS. 3 and 4, and alternative embodiments are disclosed in FIGS. 11 and 12. Those skilled in the art will readily appreciate the fact that any of the particular embodiments of the metering piston 120 could be employed in any of the alternative embodiments of the valve 20 as shown in FIGS. 1, 2, 5, 6, and 9.

Figure 3:
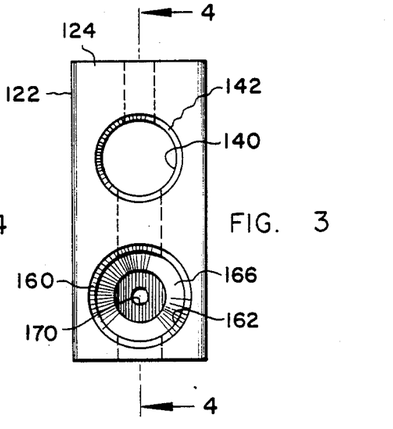
FIG. 3 shows a frontal view of the valve element.
Figure 4:
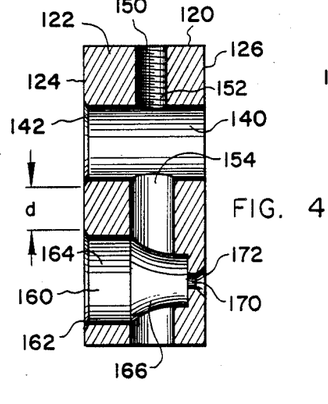
FIG. 4 shows a cross-sectional view of the valve element of FIG. 3 taken along section 4—4.

Turning now to FIGS. 3 and 4, the metering piston 120 is disclosed in greater detail. Preferably, the metering piston 120 is rectilinear, having a piston body 122 defined by a planar metering surface 124, a spaced, opposed planar biasing surface 126 and two spaced piston sidewalls 128 joining between the metering surface 124 and the biasing surface 126. A bore defining a metering orifice 140 permits flow communication from the biasing surface 126 to the metering surface 124. Preferably, the axis of the bore of the metering orifice 140 is normal to the axis of the drive screw 74. A clearance chamfer 142 is provided in the metering orifice 140 to prevent any contaminants such as dirt or particulate matter in fluid flowing through the valve 20 from interfering with the normal operation of the valve 20.

Figures 6, 7, 8, 9, 10:
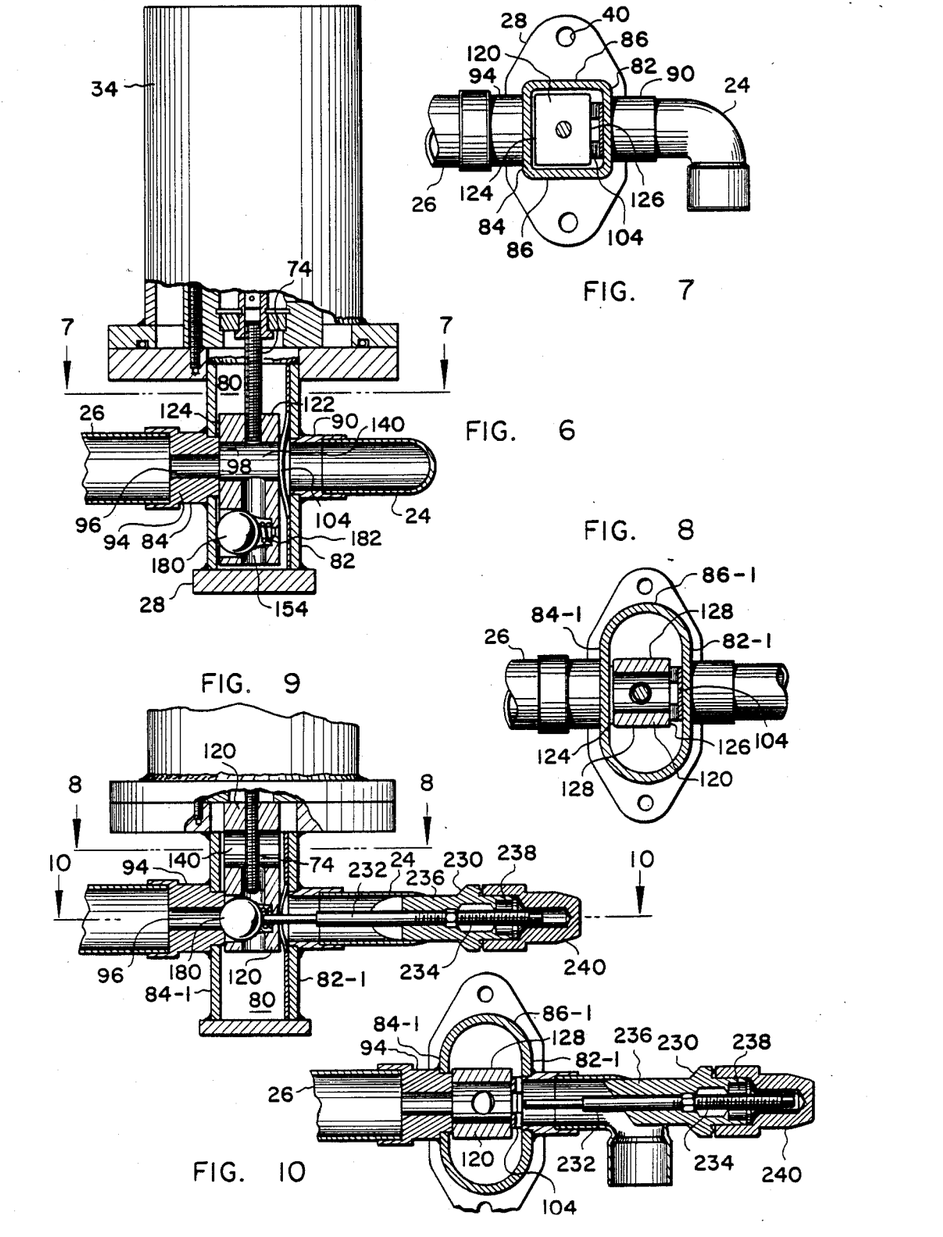
FIG. 6 shows a partial cross-sectional view of the preferred embodiment of the valve in a flow permitting condition.
FIG. 7 shows a cross-sectional view of the valve of FIG. 6 taken along section line 7—7.
FIG. 8 shows a cross-sectional view of an alternative embodiment of the valve of FIG. 6 taken along section line 7—7.
FIG. 9 shows a partial cross-sectional view of an alternative embodiment of the valve of the subject invention.
FIG. 10 shows a cross sectional view of the valve of the alternative embodiment of FIG. 9 taken along section line 10—10.

The preferred embodiment of the valve body 22 and metering piston 120 is shown in a cross-sectional view normal to the axis of the drive screw 74 in FIG. 7. The metering piston 120 is preferably rectilinear and slightly smaller in external dimensions than the dimensions of the internal metering chamber to ensure that the metering piston 120 is non-rotatable in the metering chamber 80. An alternative embodiment of the valve body 22 is depicted in FIG. 8. This alternative embodiment has a planar first wall 82.1 and a spaced, parallel planar second wall 84.1 with curved or hemispheric side walls 86-1 joining therebetween. The preferred valve body 22 in FIG. 7 may therefore be made from square steel tube stock, while the alternative embodiment of FIG. 8 may be formed from round steel tube with opposed, rolled-flat surfaces.

A drive bore 150 is provided through the piston body 122 on the axis of the drive screw 74. The drive bore 150 is comprised of a first threaded portion 152 for threaded, driving engagement between the metering piston 120 and the drive screw 74, and a second, clearance portion 154. The clearance portion 154 is larger than the outside diameter of the drive screw 74 so that the body of the drive screw 74 may pass noncontactingly through the clearance portion 154. The clearance portion 154 is sized to accept the drive screw 74 noncontactingly therethrough. It would be possible to make the entire length of the drive bore 150 threaded to accept the drive screw 74 in driving contact, however it is preferable to minimize the size of the motor 50 and hence the length of the threaded drive portion 152. As can be seen from the above description and the drawing Figures, the motor 50, motor driven shaft 62, drive collar 7, and the drive screw or shaft 74 comprises a means for moving the drive piston 120 which is positionally fixed and restrained to rotation only within the metering chamber 80 by the bearings 64 and 65.

A closure cavity 160 is defined in the piston body 122 along an axis parallel to that of the metering orifice 140. Preferably, the closure cavity 160 is spaced from the metering orifice 140 so that the piston body 122 retains a thickness D between the metering orifice 140 and the closure cavity 160. The closure cavity 160 is preferably comprised of a clearance chamfer 162 in the metering surface 124 and a co-axial large diameter bore 164, which extends a desired distance into the piston body 122 such as one-third the thickness of the piston body 122. The large bore 164 is joined by a frustoconical section or biasing member recess 166 to a co-axial, relatively small diameter guide bore 170 communicates from the biasing member recess 166 to the biasing surface 126. A guide chamfer 172 is provided in the small diameter guide bore 170.

A closure member 180, such as a steel ball or sphere of a diameter slightly smaller than that of the large bore 164 is slideably or moveably disposed within the large bore 164. The closure member 180 is biased out of the piston body 122 and against the outlet wall inner surface 100 and the outlet collar metering face 98 by a biasing means such as a coil spring 182 disposed in the medium bore 166.

Figure 11:
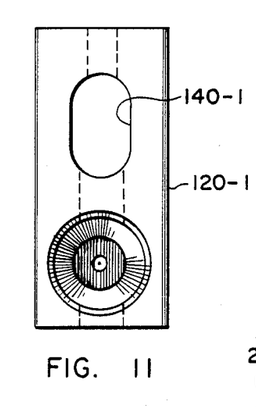
FIG. 11 shows an alternative embodiment of the valve
Figure 12:
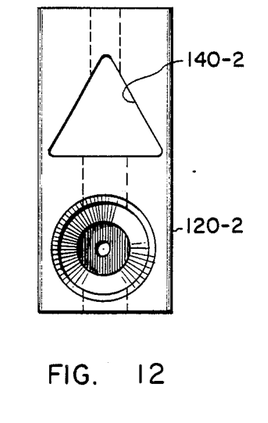
FIG. 12 shows yet another alternative embodiment of the valve element.

The metering orifice 140 in the preferred embodiment is a circular bore, however, as shown in FIG. 11 and 12, alternative geometric configurations would also be suitable. FIG. 11 discloses a metering orifice 140.1 which is ovoid along its axis, and FIG. 12 discloses a metering orifice 140.2 which is triangular along its axis. The metering orifice 140.1 is disclosed with the long axis of the ovoid oriented vertically as seen in the drawing figure, but it would be equally suitable to form the metering orifice 140.1 with the ovoid disposed horizontally, i.e., with the long axis horizontally disposed. Likewise, in FIG. 12, the apex of the triangular form of the metering orifice 140-2 is at the top and it would be equally suitable to provide the apex at the bottom of the metering orifice 140-2. The primary reason for the alternative embodiments 140-1 and 140-2 is to permit or cause the valve 20 to have different flow rate varying characteristics suitable to a wide variety of systems or applications.

Figure 13:
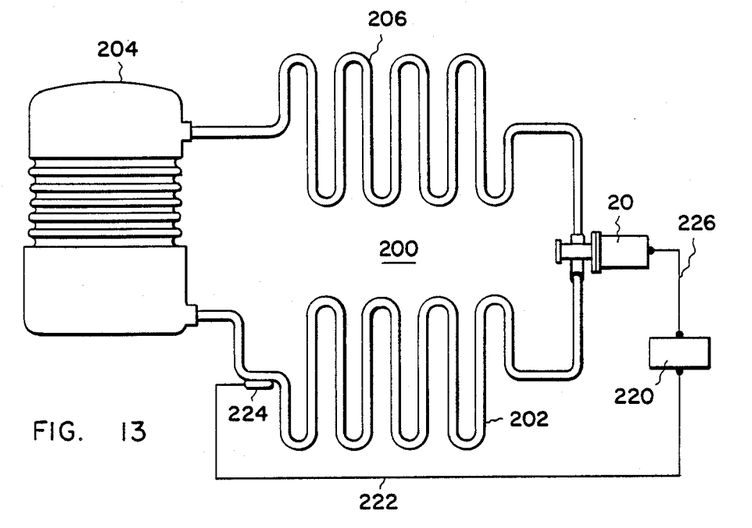
FIG. 13 shows in schematic representation a refrigeration system in which the subject invention may suitably be employed.

Preferably, the valve 20 of the subject invention would be employed as a variable slow rate expansion valve in a refrigeration system 200 for controllably circulating refrigerant in a closed loop connection. The refrigeration system 200, as shown in schematic form in FIG. 13, is comprised of a variable flow rate expansion valve 20 for providing a controlled flow rate and expansion of the refrigerant an evaporator 202 in flow connection with the valve 20 for gasifying the expanded refrigerant, a compressor 204 in flow connection with the evaporator 202 for receiving and compressing the gasified refrigerant and a condenser 206 in flow connection with the compressor 204 for receiving and liquefying the refrigerant from the compressor 204. The valve 20 is also in flow connection with the condenser 206 for receiving and controllably expanding the liquefied refrigerant. It is, of course, readily apparent to those skilled in the art that the evaporator 202 and the condenser 206 could be of any suitable design, such as a fin and tube design. It will be equally apparent to those skilled in the art that there is a large variety of suitable compressors 204, such as scroll or piston compressors, which could be suitably employed in the refrigeration system 200.

A controller 220 is connected by a first wiring harness 222 to a sensor 224. The sensor 224 is disposed at the evaporator 202 to determine either the outlet pressure or outlet temperature of the refrigerant from the evaporator 202. A second wiring harness 226 connects the controller 220 to the valve 20 to enable at least the transmission of control signals from the controller 220. It is believed that such systems are well known to those skilled in the art and need not be explained in detail herein.

While the normal operation of the preferred embodiment of the valve 20 is described hereinbelow as employed in the refrigeration system 200 for clarity of description, this should not be taken as limiting, but rather as exemplary of a suitable application of the valve 20. It will be readily apparent to those skilled in the art that the valve 20 would be equally suitable for other applications. For purposes of the description of the normal operation of the valve 20 in such an application, particular reference should be had to FIGS. 13, 2, 5 and 6.

In normal operation, the valve 20 may be incrementally moved between a fully closed position and a fully open position. The fully closed position is depicted in FIG. 2, and the fully opened position is depicted in FIG. 6. The metering piston 120 is actuated between these positions by the incremental rotary action of the stepping motor 50. As the motor 50 is stepped or incrementally rotated in response to a control signal from the controller 220, the drive screw 74 is rotated. The incremental rotation motion of the drive screw 74 is translated through the engagement between the drive screw 74 and the threaded drive portion 152 of the metering piston 120 into incremental linear motion of the metering piston 120 within the internal metering chamber 80. In other words, to cause a linear motion of the metering piston 120 upwards, the drive screw 74 is rotated in a first direction and the drive screw 74 is oppositely rotated to cause a downward linear motion of the metering piston 120. It will be apparent to those skilled in the relevant art that the motor 50, the drive screw 74, and the threaded drive portion 152 comprise a means for incrementally moving the metering piston 120 to position the metering piston 120 as desired.

In the fully closed position, the metering piston 120 is driven upward so that the closure cavity 160 is in axial alignment with the outlet collar bore 96. In this position, the closure member 180 is accepted slightly into and seated in the outlet bore 96 by the biasing element or coil spring 182 and flow is prevented from the internal metering chamber 80 to the outlet bore 96, preventing fluid flow through the valve 20.

In the fully opened position, the metering piston 120 is driven linearly downward by the drive screw 74 so that the metering orifice 140 is disposed adjacent the outlet bore 96. This permits fluid flow from the inlet aperture 88 through the metering orifice 140 to the outlet bore 96 at the maximum flow rate of the valve, as determined by the smaller of the metering orifice 140 and the outlet bore 96 and the pressure of the fluid at the inlet aperture 88.

Figure 5:
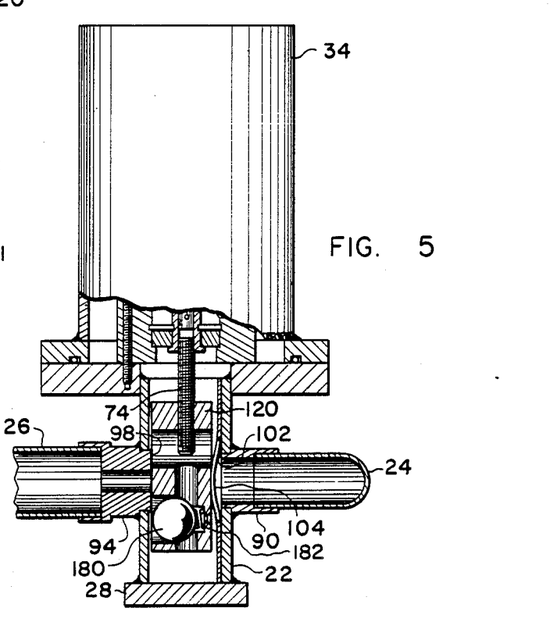
FIG. 5 shows in partial cross-section yet another view of the preferred embodiment of the valve of the subject invention.

An intermediate flow preventing condition is depicted in FIG. 5, wherein the metering surface 124 of the metering piston 120 is placed immediately adjacent to and over the outlet bore 96 in a flow preventing manner in the area defined by the dimension D, which exceeds the diameter of the outlet bore 96. In normal operating conditions, the pressure of the fluid in the inlet aperture 88 and hence in the internal metering chamber 80 will be sufficient to act upon the biasing surface 126 of the metering piston 120 to maintain a sealing engagement of the metering surface 124 and the outlet collar metering face 98. Those skilled in the art will appreciate that it would be possible to provide a metering piston 120 having no closure cavity 160 and closure member 180 in applications of the valve 20 having a relatively high inlet pressure and a lower outlet pressure, as is normally present, for example, in refrigeration systems applications.

The flow of fluid through the valve is varied by driving the metering piston 120 incrementally downward toward the full open position from the intermediate closure position. This permits an aperture defined by the outlet bore 96 and the metering orifice 140 to determine the instantaneous rate of fluid flow at a given fluid pressure at the inlet aperture. By driving the metering piston 120 upwards or downwards, the area thus defined and the flow rate through the valve 20 controlled thereby is selectively varied. Also, those skilled in the art will recognize that because the instantaneous flow rate through the valve 20 is constant at any given opening position and fluid pressure, the fluid flow through the valve 20 is free from induced pulsations capable of causing pressure shock related damage to the system in which the valve 20 is employed.

In all positions of the metering piston 120, the biasing member or bifurcated leaf spring 104 acts to bias the metering surface 124 against the metering face 98. It will be readily apparent to those skilled in the art that the biasing element 104 need not be employed in all embodiments of the valve 20, as the fluid pressure at the inlet aperture 88 and in the internal metering chamber 80 serves to bias the metering surface 124 against the metering face 98. This biasing force resulting from the fluid pressure would be sufficient in many applications to maintain a sealing force between the metering piston 120 and the outlet collar 94 and thereby eliminate the requirement for the biasing element 104.

Specifically, in the refrigeration system 200, the valve 20 would be driven to the full closure position as shown in FIG. 2 when the compressor 204 is inoperative. When additional refrigeration is required, the compressor 204 is activated to compressor refrigerant. The controller 220 will then activate the stepper motor 50 to rotatably increment and thereby linearly move the metering piston 120 to the full open position as shown in FIG. 6, or to a partially open intermediate position if desired. Preferably, the full open position will be maintained until the sensor 224 indicates through the first wiring harness 222 to the controller 220 that the condition specified by the controller 220 has been attained. The controller 220 will then transmit the appropriate signals to the stepper motor 50 to incrementally rotate and linearly increment the metering piston 120 to an intermediate open position providing a reduced flow area as defined by the aperture bounded by the cross sectional area of the metering orifice 140 exposed to the outlet bore 96. The required cross sectional area will vary according to the ambient temperatures acting upon the evaporator 202 and the condenser 206.

For example, should the sensor 224 measure a pressure or temperature indicating that undesirable flooding of the evaporator 202 is occurring, the controller 220 will activate the stepper motor 50 to linearly increment the metering piston 120 to the intermediate closed position as shown in FIG. 5. Then, when the transient flooding condition of the evaporator 202 has ceased, the controller 220 will activate the valve 20 to linearly move the metering piston 120 to a selected intermediate open position.

The refrigeration system 200 can continue in this form of operation as long as the demand for refrigeration continues. It is believed that no in-depth discussion of the principals of refrigeration system operation need be undertaken herein, as such systems are generally well known to those skilled in the art.

Figure 14:
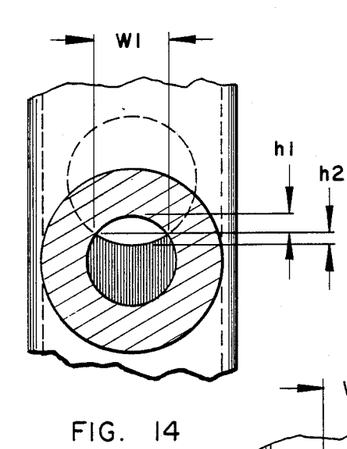
FIG. 14 shows the available flow area in one intermediate flow position of the preferred embodiment.

The operation of the preferred embodiment of the valve 20 produces a non-linear rate of change of the flow area defined by the area of the metering orifice 140 exposed to the outlet bore 96 at any given position of the metering piston 120. As shown in FIG. 14, this area is the sum of two chords of width W1 as determined by the instantaneous position of the metering piston 120. The first chord is of width W1 and height H1, based on the diameter of the outlet bore 96, and the second chord is width W1 and height H2 based upon the diameter of the metering orifice 140. As the width W1 varies non-linearly with a constant linear movement of the metering piston 120, the preferred embodiment provides a non-linear rate of change.

Figure 15:
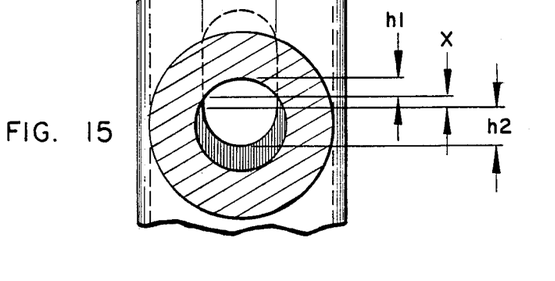
FIG. 15 shows the available flow area in an intermediate flow position of the alternative embodiment shows in FIG. 11.

The first alternative embodiment as shown in FIGS. 11 and 15, provides an initial non-linear rate of change of flow area similar to that discussed in the preferred embodiment, with a subsequent linear rate of change. The non-linear rate of change portion results from the height H2 and the width W2, as shown in FIG. 15. However, unlike the preferred embodiment, at any point in the interval X the rate of change of the flow area will vary linearly with a linear positional change of the metering piston 120.

Figure 16:
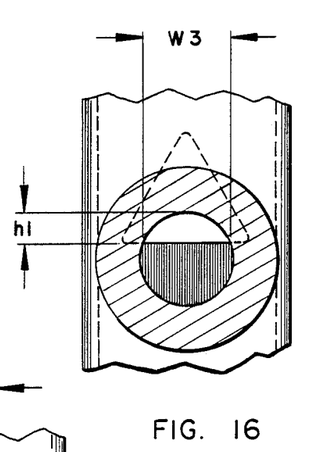
FIG. 16 shows the available flow area in an intermediate flow position of the alternative embodiment shown in FIG. 12.

Finally, the second alternative embodiment as shown in FIGS. 12 and 16 provides a very rapid non-linear rate of change of flow area based upon an area determined by a chord of width W3 and height H1 based solely upon the diameter of the outlet bore 96 in response to a constant linear movement of the metering piston 120.

It will be readily apparent to those skilled in the art that a wide variety of combinations of geometric shapes of the outlet bore 96 and metering orifice 140 exist, each of which will produce a unique flow area and fluid flow rate at any given position and that there are many combinations of linear and non-linear rates of change of fluid flow area in response to a constant linear movement of the metering piston 120. Also, it will be recognized that the sizes of the outlet bore 96 and metering orifice 140 can be readily changed as well to accommodate a wide variety of applications and fluid flow rates.

FIGS. 9 and 10 disclose yet another alternative embodiment of the valve 20. An axial closure device 230 is disposed in the inlet tubing 24. The axial closure device 230 is comprised of a block member 232 having a drive thread portion 234 operating linearly in the device body 236. A seal 238 disposed within the closure device body 236 prevents the flow or leakage of fluid from within the inlet tubing 24. An actuating knob 240 is provided for causing rotary motion of the lock member 232 in response to manual rotation of the actuating knob 240.

In operation, the valve operates normally in all respects as described above, however when the valve is in the full closure position the actuating knob 240 may be rotated to cause the lock member 232 to advance linearly through the small guide bore 170 of the metering piston 120. The lock member 232 is advanced into contact with the closure member 180 to forcibly seat the closure member 180 in the outlet bore 96. The valve 20, when equipped with the alternative axial closure device 230, acts as a positive backflow preventing shutoff valve. This permits removal of fluid from the inlet tubing 24 which in turn aids in the servicing and maintenance of the systems to which such a valve 20 is applied.

Preferably, the components of the valve 20 are constructed of suitable steel alloys. The metering face 98 of the outlet collar 94 is milled or ground flat, as is the metering surface 124 of the metering piston 120. Also, the drive collar 70 engages the drive screw 74 in a compliant manner to permit compliant movement of the metering piston 120 within the metering chamber 80. This compliant movement of the metering piston 120 will permit the intermittent passage of debris or particulate matter through the valve 20 by enabling the metering piston 120 to disengage the metering face 98 should debris or particulate matter intrude therebetween. Should this occur, inlet pressure fluid will pass through the gap thus created and flush the debris or particulate matter into the outlet bore 96. In the absence of the debris or particulate matter, the metering piston 120 will again be seated against the metering face 98, thereby preventing inaccurate operation of or failure of the valve 20.

It will be readily apparent to those skilled in the art that the valve 20 provides an incremental, rotary actuated variable flow rate valve which is of simple construction and highly reliable in operation. It is also apparent that the valve 20 is readily susceptible of mass production, having only a very minimal requirement for close machining tolerances, and therefore being low in initial cost and in maintenance requirements and costs.

Finally, it should be noted that the valve 20 is readily suitable for application in a refrigeration system as a rotary actuated expansion valve to permit a smooth, pulse free fluid flow through the valve with relative immunity to effects from foreign matter or debris. Therefore, the valve 20 provides a substantial advance in the state of the art of electrically actuated variable flow rate valves and provides substantial advantages over the known prior art.

Modifications to the preferred embodiments of the subject invention will be apparent to those skilled in the art within the scope of the claims that follow hereinbelow.

What is claimed is:

1. A refrigeration system for controllably circulating refrigerant in closed loop connection comprised of:
   an evaporator for gasifying refrigerant;
   a compressor in flow connection with said evaporator for receiving and compressing said gasified refrigerant;
   a condenser in flow connection with said compressor for receiving and liquefying said refrigerant;
   a variable flow rate expansion valve in flow connection with said condenser for receiving said liquefied refrigerant and controllably expanding said refrigerant, said valve in flow connection with said evaporator for directing said expanded refrigerant to said evaporator, said valve comprised of:
   a valve body defining an internal metering chamber having a substantially planar outlet surface, said valve body having a first wall with an inlet aperture for permitting fluid flow into said metering chamber and a second wall including a planar outlet surface with an outlet aperture for permitting fluid flow from said metering chamber;
   a metering piston disposed in said metering chamber in sliding engagement with said planar outlet surface, said metering piston having a metering orifice; and
   means for incrementally moving said metering piston in said metering chamber normal to said outlet aperture, said metering piston moving means fixed in said internal metering chamber.

2. A refrigeration system for controllably circulating refrigerant in closed loop connection comprised of:
   an evaporator for gasifying refrigerant;
   a compressor in flow connection with said evaporator for receiving and compressing said gasified refrigerant;
   a condenser in flow connection with said compressor for receiving and liquefying said refrigerant;
   a variable flow rate expansion valve in flow connection with said condenser for receiving said liquefied refrigerant and controllably expanding said refrigerant, said valve in flow connection for directing said expanded refrigerant to said evaporator, said valve comprised of:
   a valve body defining an internal, generally rectilinear metering chamber, said valve body having a first wall defining an inlet aperture for permitting fluid flow into said metering chamber and a second wall defining an outlet aperture for permitting fluid flow from said metering chamber;
   a substantially rectilinear metering piston disposed in said metering chamber, said metering piston having a metering orifice and a closure cavity spaced from said metering orifice, said metering piston further having a bore connecting said metering orifice and said closure cavity;
   a closure member disposed in said closure cavity for sealingly engaging said second side of said valve body;
   means for sealingly biasing said metering piston toward said planar outlet surface of said valve body metering chamber;
   means for biasing said closure member toward said planar outlet surface of said valve body;
   an incremental linear actuator for slideably moving said metering piston in said metering chamber;
   means for sensing refrigerant condition at a point in said refrigeration system; and
   means for controllably incrementing said variable flow rate expansion valve in response to said means for sensing refrigerant condition.

3. The refrigeration system as set forth in claim 1 wherein said means for incrementally moving said metering piston is further comprised of an incremental linear actuator.

4. The refrigeration system as set forth in claim 3 wherein said linear actuator is further comprised of a rotary stepping motor and means for translating rotary motion to linear motion.

5. The refrigeration system as set forth in claim 4 wherein said means for translating rotary motion into linear motion is comprised of a drive member rotationally connected to said stepping motor, said drive member in linear driving engagement with said metering piston for linear movement of said metering piston in response to rotation of said drive member.

6. The refrigeration system as set forth in claim 1 wherein said variable flow rate valve further includes means for sealingly biasing said metering piston against said planar outlet surface of said valve body metering chamber.

7. The refrigeration system as set forth in claim 6 wherein said means for sealingly biasing said metering piston is further comprised of a spring disposed between said first wall of said valve body and said metering piston.

8. A refrigeration system as set forth in claim 1 wherein said metering piston is rectilinear and further includes an aperture defining a closure cavity spaced from said metering orifice.

9. The refrigeration system as set forth in claim 2 wherein said incremental linear actuator is further comprised of a rotary stepping motor and means for translating rotational motion to linear motion.

10. The refrigeration system as set forth in claim 9 wherein said means for translating rotational motion into linear motion is comprised of a threaded drive member rotationally connected to said stepping motor, said drive member in driving engagement with said metering piston for linear movement of said metering piston in response to rotation of said drive member.

11. The refrigeration system as set forth in claim 2 wherein said means for sealingly biasing said metering piston is further comprised of a spring disposed between said first wall of said valve body and said metering piston.

12. The refrigeration system as set forth in claim 2 wherein said closure cavity is a cylindrical bore.

13. The refrigeration system as set forth in claim 12 wherein means for biasing said closure member is a spring disposed in said closure cavity of said metering cavity.

14. The refrigeration system as set forth in claim 13 wherein said closure member is a cylinder slideably disposed in said closure cavity.

15. The refrigeration system as set forth in claim 13 wherein said closure member is a sphere slideably disposed in said closure cavity.

16. A refrigeration system for controllably circulating refrigerant in closed loop connection comprised of:
an evaporator for gasifying refrigerant;
a compressor in flow connection with said evaporator for receiving and compressing said gasified refrigerant;
a condenser in flow connection with said compressor for receiving and liquefying said refrigerant;
a variable flow rate expansion valve in flow connection with said condenser for receiving said liquefied refrigerant and controllably expanding said refrigerant, said valve in flow connection with said evaporator for directing said expanded refrigerant to said evaporator, said valve comprised of
a valve body defining an internal metering chamber having a substantially planar outlet surface, said valve body having a first wall with an inlet aperture for permitting fluid flow into said metering chamber and a second wall including a planar outlet surface with an outlet aperture for permitting fluid flow from said metering chamber;
a rectilinear metering piston disposed in said metering chamber in sliding engagement with said planar outlet surface, said metering piston having a metering orifice and an aperture defining a closure cavity spaced from said metering orifice;
a closure member disposed in said closure cavity for sealingly engaging said second wall of said valve body;
means for biasing said closure member against said planar outlet surface of said valve body; and
means for incrementally moving said metering piston in said metering chamber normal to said outlet aperture.

17. The refrigeration system as set forth in claim 16 wherein means for biasing said closure member is a spring disposed in said closure cavity of said metering cavity.

18. The refrigeration system as set forth in claim 17 wherein said closure member is spherical.

19. A refrigeration system for controllably circulating refrigerant in closed loop connection comprised of:
an evaporator for gasifying refrigerant;
a compressor in flow connection with said evaporator for receiving and compressing said gasified refrigerant;
a condenser in flow connection with said compressor for receiving and liquefying said refrigerant;
a variable flow rate expansion valve in flow connection with said condenser for receiving said liquefied refrigerant and controllably expanding said refrigerant, said valve being in flow connection for directing said expanded refrigerant to said evaporator, said valve comprised of
a valve body defining an internal, generally rectilinear metering chamber having a generally planar outlet surface, said valve body having a first wall with a bore therethrough defining an inlet aperture for permitting fluid flow into said metering chamber and a second wall having a bore therethrough defining an outlet aperture for permitting fluid flow from said metering chamber;
a substantially rectilinear metering piston nonrotatably disposed in said metering chamber in sliding contact with said planar outlet surface, said metering piston having an aperture co-axial with said outlet aperture defining a metering orifice and a cylindrical closure cavity spaced from said meeting orifice, said metering piston further having a bore connecting said metering orifice and said closure cavity;
a spherical closure member disposed in said cylindrical closure cavity for sealingly engaging said second side of said valve body;
means for sealingly biasing said metering piston toward said planar outlet surface of said valve body metering chamber;
means for biasing said closure member toward said planar outlet surface of said valve body;
a threaded drive shaft rotatably mounted in said valve body;
a rotary incrementing stepping motor secured to said drive shaft for rotating said drive shaft;
means for sensing refrigerant condition at a point in said refrigeration system; and
means for controllably said variable flow rate expansion valve in response to said means for sensing refrigerant condition.

* * * * *

UNITED STATES PATENT AND TRADEMARK OFFICE
CERTIFICATE OF CORRECTION

PATENT NO. : 4,928,494
DATED : May 29, 1990
INVENTOR(S) : Paul R. Glamm

It is certified that error appears in the above-identified patent and that said Letters Patent is hereby corrected as shown below:

Column 3, line 45, after "valve" insert --element.--.

Column 6, line 20, "82.1" should be --82-1--.

Column 6, line 21, "84.1" should be --84-1--.

Column 7, line 7, "140.1" should be --140-1--.

Column 7, line 9, "140.2" should be --140-2--.

Column 7, line 10, "140.1" should be --140-1--.

Column 7, line 13, "140.1" should be --140-1--.

Claim 2, Column 11, line 68, after "valve" insert --being--.

Claim 19, Column 14, line 34, "meeting" should be --metering--.

Signed and Sealed this

Thirteenth Day of August, 1991

*Attest:*

HARRY F. MANBECK, JR.

*Attesting Officer*     *Commissioner of Patents and Trademarks*